Patented Oct. 22, 1940

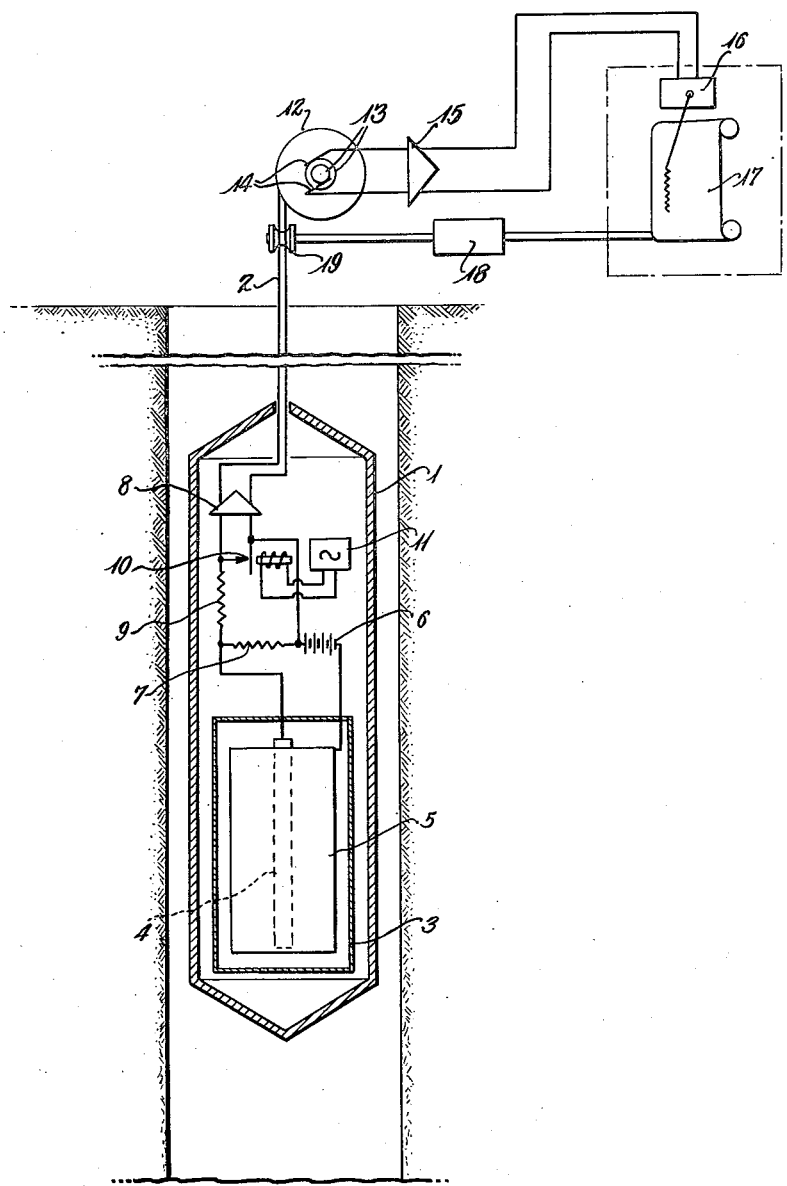

2,219,273

UNITED STATES PATENT OFFICE 2,219,273

WELL LOGGING BY MEASUREMENTS OF RADIOACTIVITY

Serge Alexander Scherbatskoy, Tulsa, Okla., assignor to Well Surveys, Incorporated, Tulsa, Okla., a corporation of Delaware Application June 16, 1939, Serial No. 279,577

13 Claims. (Cl. 250—83)

This invention relates to a method and apparatus for geophysical exploration and particularly to a method and device for measuring radiations from radioactive materials in subsurface strata as these radiations penetrate a drill hole or well bore. In copending applications by Jacob Neufeld, Serial No. 161,350, filed August 27, 1937, bearing the title Method of and apparatus for radioactive investigation of drill holes, and Serial No. 277,964, filed June 7, 1939, bearing the title Method and apparatus for radioactive investigation of drill holes, there have been described devices which can be lowered into a well or other opening in the ground and which will detect and measure the intensity of any radiations encountered therein. In a copending application of Robert E. Fearon, Serial No. 239,781, filed November 10, 1938, a somewhat similar device is described, which differs in that it carries with it a source of radiations and measures the radiations scattered and returned from that source. These devices are of such a nature that they can gather important data even in a cased drill hole, that is, a drill hole which is surrounded by a steel casing of a thickness of three-eighths of an inch or greater. The devices are also so arranged that the depths to which they are lowered may be measured concomitantly with the measurements of the radiations and the two sets of measurements correlated in a single recording.

Briefly, the devices of the mentioned patent applications consist of a housing supported by a cable which extends from the housing to the surface of the ground and serves both to support the housing and to make electrical connection between the devices in the housing and the recording equipment on the surface of the ground. In the housing there is either a Geiger-Muller counter which consists of a pair of electrodes, usually a rod surrounded by a cylinder, enclosed in an hermetically sealed compartment which contains in addition to the electrodes only a very rarefied gas, or a similar device, which may be referred to as a high pressure ionization chamber and which differs from the Geiger-Muller counter in that it contains an inert gas such as nitrogen under a very high pressure, say of around 300 pounds per square inch. The Geiger-Muller counter permits surges of current to pass through it when molecules of the gas are struck by radiations and a sufficient potential is applied across it. The high pressure ionization chamber, with sufficient potential applied across it, permits a continuous current to flow the magnitude of which depends upon the itensity of the radiations.

When the Geiger-Muller counter is used difficulty is experienced because the device must be completely stopped at various points in the well bore until the impulses of the counter have been counted for a sufficient period of time to give an accurate indication of the intensity of the radiations, or the device must be moved extremely slowly in order that the count made during the movement of the device will give a sufficient indication. The high pressure ionization chamber is an improvement in this respect in that there is a continuous current flowing and the magnitude changes rapidly in accordance with any changes in the intensity of the radiations. This permits measurements to be made while the device is being raised or lowered in a well without the necessity of making any stops or of making the movement extremely slow.

Difficulty with this latter device is encountered, however, because of the extreme accuracy with which it is desired to make measurements and the fact that the current flow is unidirectional and therefore needs to be amplified with a direct current amplifier so as to make it strong enough to send to the surface. Unfortunately, direct current amplifiers are subject to so-called "drifts" which means that the output does not bear a constant relation to the input, and this, obviously, introduces an undesirable error in the recorded measurements.

These "drifts" appear to be caused mostly by variations in the temperatures at the sealed joints between the elements of the vacuum tubes and between the wires which constitute the circuit in which the tubes operate. Each of these joints constitutes a miniature thermocouple and the variation in the voltage they produce due to variations in temperature becomes quite important when the voltages to be measured are very small as they are in the present instance. Since each tube always includes a filament which is heated the temperature of the tube is always different from the temperature of its surroundings and it is practically impossible to so stabilize the temperature of the tube and its surroundings that there will not be gradual changes in temperature and accompanying variations in thermal voltages that will introduce appreciable errors into the measurements.

In addition to the "drifts" already mentioned there is an additional source of error which can be termed "direct current microphonics." When an electron tube is given a jar the elements are deformed and this deformation causes variations to appear in the current output. These variations are usually termed "alternating current microphonics" and contain frequencies in the vicinity of the natural frequencies of the various elements in the tubes. In addition to these microphonics there is a certain amount of permanent deformation that is suffered by the elements when they are subjected to shock. This permanent deformation causes a permanent change in the space current after each shock. This is often called "direct current microphonics."

It has been found that in practice the thermal current changes and other variations in a direct current amplifier than those caused by shock can be kept from having an effect greater than that which would be caused by a change of about one-tenth millivolt per minute on the grid of the first tube, but that in the best possible design the direct current microphonics caused by modest tapping of the amplifiers with the forefinger is at least five times that magnitude, having the same effect as would be caused by changing the voltage on the grid of the first tube about one-half of a millivolt per minute. Since the thermal drift will occur more or less continuously it is possible to draw a "drift" curve and consequently to at least partially take into account the errors caused thereby. Microphonics, however, are caused by erratic influences and consequently it is impossible to compensate for such changes in a similar manner.

The present invention overcomes these important difficulties and permits much more accurate determinations to be made without interference by the sources of error mentioned above. This improvement is accomplished by taking from the ionization chamber circuit a current the voltage of which is proportional to the flow of current in the ionization chamber circuit, periodically interrupting the flow of this current so as to provide an alternating or interrupted current, and applying this alternating or interrupted current across the input terminals of an alternating current amplifier, the output of which is carried to the surface and recorded by the use of an alternating current operated recorder.

Such a method and apparatus can be used in connection with any device of the general type of those disclosed in the Neufeld and Fearon applications mentioned above whether they operate upon the natural radioactivity of the surrounding strata, or upon radiations which originate with, or are caused by, radioactive materials or other sources of radioactivity contained in the device itself or placed in a well in other ways. Regardless of the source of the radiations or the type of device used to detect them it is necessary to transmit very small electrical variations from the device to the surface of the earth with the utmost accuracy and, according to this invention, it has been found that this can be best accomplished by converting the direct current into alternating or interrupted current before amplification and thereafter amplifying it with an alternating current amplifier and using the amplified alternating current to operate the recorder on the surface. In this way the direct current "drifts," "microphonics" and other disturbances are all eliminated and a much more accurate record produced.

In the accompanying drawing the diagrammatic showing has been made of one embodiment of this invention. A thorough understanding of the detailed advantages of the invention may be gained from a study of the drawing together with the following description of it but it is to be understood that the drawing illustrates only one form of a device embodying the principles of this invention and that many variations are possible within the scope thereof.

As illustrated by the drawing the process of this invention may be performed with a device which consists of a main housing 1 containing the detecting and amplifying devices and suspended on the lower end of a cable 2 which serves both to support the housing and furnish electrical connections between the housing and the surface apparatus.

Within the casing 1 is an ionization chamber which consists of an hermetically sealed compartment 3, containing a pair of spaced electrodes 4 and 5 in an atmosphere of nitrogen under a pressure of around 300 pounds per sq. in. The inner electrode 4, as shown in the drawing, is in the shape of a vertical rod, and the outer electrode 5 has the shape of a cylindrical tube with a radius of about 2 inches. Both electrodes are preferably of iron although other metals can be used. Other gases and other pressures can also be used.

Connected across the electrodes of the ionization chamber is a battery 6 having a potential of around 150 volts. The negative side of the battery is connected to the outer electrode and the positive side is connected through a resistor 7 to the inner electrode. The resistor 7 preferably has a relatively high resistance, for example, of around $10^{12}$ ohms. The voltage drop across this resistance is used to operate an alternating current amplifier 8 also contained in the housing 1, and this is accomplished by connecting one end of the resistor directly to the amplifier and the other end of the resistor to the amplifier through a secondary resistance 9 which may, for example, be of the order of $10^{11}$ ohms.

In order to interrupt the current to the amplifier 8 so as to permit the amplifier to function as an alternating current amplifier rather than as a direct current amplifier, a magnetically operated contacting device 10 is placed directly across the input terminals of the amplifier, and this contacting device is operated preferably at a frequency of around 100 cycles by a source of alternating current 11, which may be an oscillator, or a buzzer and battery, or any other combination of electrical elements that will generate the necessary alternating current. A preferred form of contactor 10 contains a vibrating reed with a tungsten contact face and a stationary contact element which touches the vibrating element during part of the cycle. During the intervals of contact between the vibrating element and the stationary elements the voltage applied across the input terminals of the amplifier 8 is zero. During the intervals when the contactor 10 is open the voltage across the amplifier 8 will be derived from the output of the ionization chamber. The above described cycle of operations in the contactor 10 results in alternating voltage applied across the input terminals of the amplifier 8, the magnitude of which voltage is proportional to the steady current derived from the ionization chamber. The output of the amplifier 8 is connected to the cable 2 through which it passes to the surface of the ground. The purpose of the secondary resistor 9 is to prevent the potential across the main resistor 7 from falling to zero when the contactor 10 is closed. With the secondary resistor 9 in the circuit the potential across the main resistor 7 will be substantially maintained although the potential across the input of the amplifier is reduced to zero or substantially so.

The upper end of cable 2 is wound on a drum 12 which is rotated by means not shown to raise and lower the exploring device in the ground. The drum 12 carries slip rings 13 to which the conductors of cable 2 are connected. By means of brushes 14 the currents from cable 2 are taken from the slip rings and applied to a further amplifier 15, the output of which is connected to an alternating current voltmeter 16 which acts in conjunction with a recorder 17 to record the various measurements. The recorder 17 is driven through connection 18 and a spool 19 which contacts the cable 2 as it goes in and out of the drill hole and thus the recording made by the recorder 17 plots the various measurements in direct correlation with the depths at which they are taken. Other methods of correlating the recorder operations with the movement of the exploring device up and down in the well bore may be used, for example, a "Selsyn" transmission system may be connected between the cable drum 11 and the recorder.

I claim:

1. A method of obtaining geophysical data that comprises impressing a constant potential across spaced electrodes in an atmosphere of inert gas under superatmospheric pressure, continuously lowering said electrodes into an opening in the earth, obtaining from the electrode circuit a substantially continuous electrical output current the voltage of which corresponds to the current flow in the electrode circuit altered by radiation from surrounding strata, converting said output current to a pulsating signal, amplifying said signal, continuously recording the amplified signal, continuously measuring the depth at which the electrodes are positioned in the earth, and continuously recording said measurements in correlation with the record of said current.

2. A method of obtaining geophysical data that comprises impressing a potential across spaced electrodes in an atmosphere of inert gas to cause a substantially continuous current flow altered by radiation from surrounding strata, positioning said electrodes below the surface of the earth, generating an alternating current of greater magnitude that the current in the electrode circuit but controlled by the current in the electrode circuit so as to vary in accordance therewith, transmitting said alternating current to the surface of the earth, ascertaining the depth at which the electrodes are positioned and recording in correlation the magnitude of the alternating current and the depth of the electrodes.

3. A method of obtaining geophysical data that comprises impressing a potential across spaced electrodes in an atmosphere of inert gas, positioning said electrodes below the surface of the earth, obtaining from the electrode circuit a substantially continuous electrical output current the voltage of which corresponds to the current flow in electrode circuit but which is altered by radiation from surrounding strata, converting said output current to a pulsating signal by intermittent short-circuiting, amplifying said signal, recording the amplified signal, ascertaining the position of the electrodes and recording their position in correlation with the record of the amplified current.

4. A method of obtaining geophysical data that comprises impressing a constant potential across spaced electrodes in an atmosphere of inert gas under superatmospheric pressure, lowering said electrodes to various depths into an opening in the earth, obtaining from the electrode circuit a substantially continuous electrical output current the voltage of which corresponds to the current flow in the electrode circuit but which is altered by radiation from surrounding strata, converting said output current to a continuously uniformly pulsating signal, amplifying said signal, recording the amplified signal, measuring the depths to which said electrodes are lowered into the earth and recording said measurements in correlation with said current recordings.

5. An apparatus for geophysical exploration that comprises a casing adapted to be lowered into an opening in the earth, an ionization chamber sensitive to radiation from surrounding strata mounted in said casing including a pair of spaced electrodes and an inert gas under superatmospheric pressure, means to supply a constant potential across the electrodes causing a substantially continuous current flow, a resistance in series with said potential supply and electrodes, an amplifier and periodic interrupter in parallel across said resistance, and means for conveying the output of said amplifier to the surface and supporting the casing at various depths within the opening.

6. An apparatus for geophysical exploration that comprises a casing adapted to be lowered into an opening in the earth, an ionization chamber in said casing including a pair of spaced electrodes and an inert gas under superatmospheric pressure, means to supply a potential across the electrodes causing a continuous current flow, means for converting said continuous current to an alternating current, means for amplifying said alternating current, means for measuring the depth to which the casing is lowered into the opening and means for recording in correlation the depth of the casing in the opening and the output of the amplifier.

7. An apparatus for geophysical exploration that comprises a casing adapted to be lowered into an opening in the earth, an ionization chamber in said casing including a pair of spaced electrodes and an inert gas, a source of electrical potential and a relatively high resistance connected in series across said electrodes, a second high resistance and switch connected in series across said first mentioned resistance, means to automatically open and close said switch at relatively short intervals of time, an alternating current amplifier connected across the contacts of said switch, means for conveying the output of said amplifier to the surface of the earth, means for measuring the depths to which the casing is located in the earth and means for recording the measurements of depth and the output of the amplifier in correlation.

8. An apparatus for geophysical exploration that comprises a casing adapted to be lowered into a cased drill hole, an ionization chamber in said casing including a pair of spaced electrodes and nitrogen under around 300 pounds per square inch of pressure, a battery having an output of around 150 volts and a resistance of around $10^{12}$ ohms in series across said electrodes, a resistance of around $10^{11}$ ohms and a magnetically operated switch across said first mentioned resistance, a generator of alternating electrical current of about 100 cycles frequency connected to operate said switch, an alternating current amplifier connected across the contacts of said switch, means to convey the output of said amplifier to the surface of the earth, means to measure the depths to which the casing is lowered into the earth and a recorder for recording the output of said amplifier in correlation with the measurements of depth.

9. An apparatus for geophysical exploration that comprises a casing adapted to be lowered into a cased drill hole, an ionization chamber in said casing including a pair of spaced electrodes and nitrogen under around 300 pounds per square inch of pressure, said electrodes comprising an iron rod surrounded by a sheet iron cylinder of about 2 inches diameter, a battery having an output of around 150 volts and a resistance of around $10^{12}$ ohms in series across said electrodes, a resistance of around $10^{11}$ ohms and a magnetically operated switch across said first mentioned resistance, a generator of alternating electrical current of about 100 cycles frequency connected to operate said switch, an alternating current amplifier connected across the contacts of said switch, means to convey the output of said amplifier to the surface of the earth, means to measure the depths to which the casing is lowered into the earth and a recorder for recording the output of said amplifier in correlation with the measurements of depth.

10. An apparatus for geophysical exploration that comprises a casing adapted to be lowered into a cased drill hole, an ionization chamber in said casing including a pair of spaced electrodes and nitrogen under around 300 pounds per square inch of pressure, a battery having an output of around 150 volts and a resistance of around $10^{12}$ ohms in series across said electrodes, a resistance of around $10^{11}$ ohms and a magnetically operated switch across said first mentioned resistance, a generator of alternating electrical current of about 100 cycles frequency connected to operate said switch, an alternating current amplifier connected across the contacts of said switch, means to convey the output of said amplifier to the surface of the earth, means to further amplify said output, means to measure the depths to which the casing is lowered into the earth and a recorder for recording the output of said second amplifier in correlation with the measurements of depth.

11. In a device for obtaining geophysical data in which an ionization chamber is lowered into a well bore and the effect of radiations impinging upon it from the surrounding strata is measured and recorded at the surface, the improvement that comprises a fixed resistance in the ionization chamber circuit, an alternating current amplifier the input of which is connected in series with a second fixed resistance across said first resistance, a periodically actuated short circuiting switch across the input of said amplifier, means to transmit the output of said amplifier to the surface of the earth and means to record the said output at the surface.

12. A method of geophysical exploration comprising continuously moving spaced differentially charged electrodes in the vicinity to be explored, deriving from the electrodes a substantially continuous current modified by radiation from surrounding strata, converting the substantially continuous current to a continuously uniformly pulsating signal, continuously amplifying the signal current, and continuously recording the amplified signal current in correlation with measurements of the locality of observation.

13. In combination with a device for obtaining geophysical data of the type including an ionization chamber delivering a continuous current sensitive to radiations impinging thereon, of the improvements which comprise a converter for receiving the continuous current from the ionization chamber and changing the same to a pulsating signal of uniform frequency, an amplifier for increasing the magnitude of the pulsating signal, and recording means operated by the amplifier for correlating the pulsating signal with measurements of the location at which the observation was made.

SERGE ALEXANDER SCHERBATSKOY.